United States Patent [19]
Schmidt

[11] Patent Number: 5,304,301
[45] Date of Patent: Apr. 19, 1994

[54] APPARATUS FOR THE INJECTION OF COMPRESSED AIR INTO A LIQUID

[75] Inventor: Hans Schmidt, Liebenburg, Fed. Rep. of Germany

[73] Assignees: Berthold Schreiber, Hannover; Erhard Schreiber, Langenhagen, both of Fed. Rep. of Germany

[21] Appl. No.: 780,751

[22] Filed: Oct. 23, 1991

[30] Foreign Application Priority Data

Oct. 24, 1990 [DE] Fed. Rep. of Germany ....... 4033814
Dec. 3, 1990 [DE] Fed. Rep. of Germany ....... 4038504

[51] Int. Cl.⁵ ................................................ B01F 3/04
[52] U.S. Cl. ................................ 210/220; 261/122.2
[58] Field of Search .................... 261/122, 100, 122.2; 210/220, 221.1, 221.2

[56] References Cited

U.S. PATENT DOCUMENTS

| | | | |
|---|---|---|---|
| 3,953,553 | 4/1976 | Thayer | 261/122 |
| 4,060,486 | 11/1977 | Schreiber | 261/122 |
| 4,118,447 | 10/1978 | Richter | 261/122 |
| 4,165,286 | 8/1979 | Schreiber | 261/122 |
| 4,640,803 | 2/1987 | Schmidt-Kufeke | 261/122 |
| 4,818,446 | 4/1989 | Schreiber | 261/122 |
| 4,929,397 | 5/1990 | Jager | 261/122.1 |
| 4,954,296 | 9/1990 | Ott | 261/122 |
| 4,960,546 | 10/1990 | Tharp | 261/122 |
| 5,013,493 | 5/1991 | Tharp | 261/122 |
| 5,034,165 | 7/1991 | Willinger | 261/122.1 |
| 5,059,358 | 10/1991 | Tharp | 261/122 |
| 5,133,906 | 7/1992 | Louis | 261/122.1 |

FOREIGN PATENT DOCUMENTS

| | | | |
|---|---|---|---|
| 3319161 | 11/1984 | Fed. Rep. of Germany | 261/122 |
| 3418548 | 11/1985 | Fed. Rep. of Germany | 261/122 |
| 3514028 | 10/1986 | Fed. Rep. of Germany | 261/122.2 |
| 3536507 | 4/1987 | Fed. Rep. of Germany | 261/122 |
| 3624580 | 2/1988 | Fed. Rep. of Germany | 261/122.2 |
| 3639473 | 5/1988 | Fed. Rep. of Germany | 261/122.2 |
| 3819305 | 7/1990 | Fed. Rep. of Germany | 261/122.2 |

*Primary Examiner*—Thomas M. Lithgow
*Attorney, Agent, or Firm*—Bell, Seltzer, Park & Gibson

[57] ABSTRACT

Apparatus for injection of compressed air into a liquid such as waste water comprises a tubular basic body surrounded by a flexible, perforated membrane through which compressed air is supplied through radial openings in the basic body to be dispersed by the perforated membrane as fine bubbles into the liquid. The basic body is connected to a compressed air supply pipe through a hollow connecting body that supports the basic body and supplies compressed air to radial openings in the basic body. In one embodiment, air-conducting passageways are arranged concentrically about the hollow connecting body. The hollow connecting body provides a flooding zone in communication with the tubular basic body and sealed from the air-conducting passageways. Liquid flows therethrough to avoid dead zones of untreated liquid. The common flooding zone provides a floodable volume relative to a non-floodable volume of greater than 1.3.

25 Claims, 4 Drawing Sheets

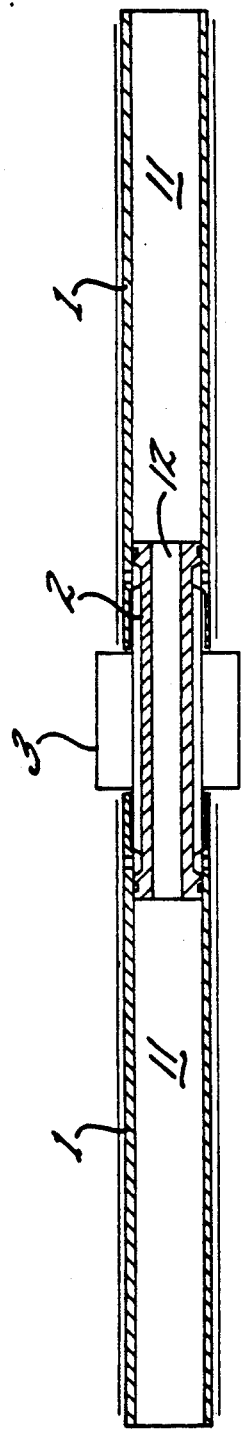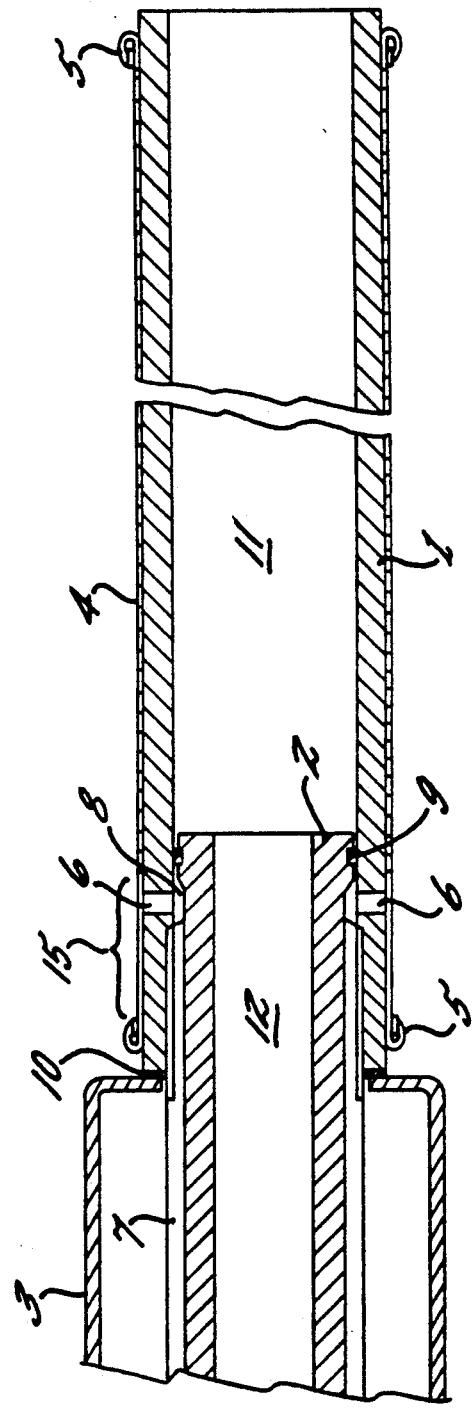

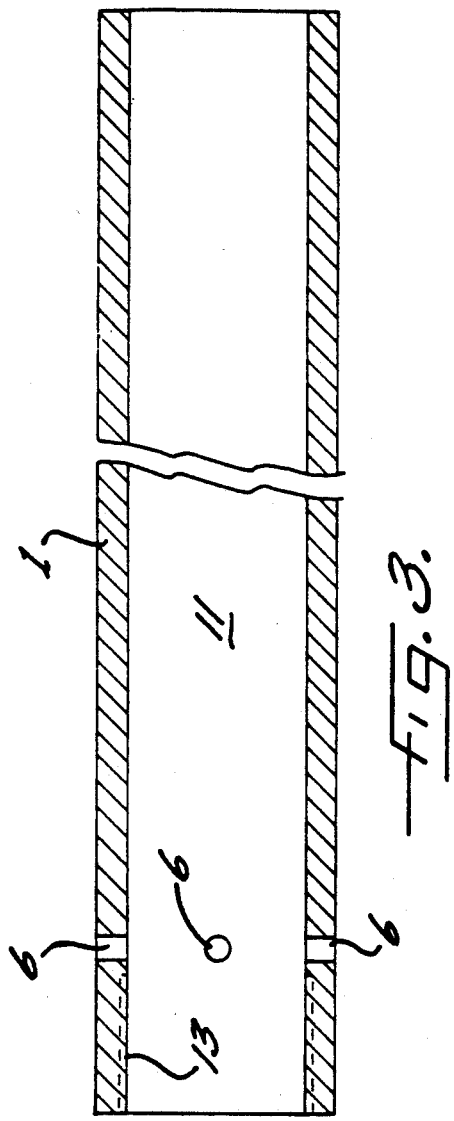
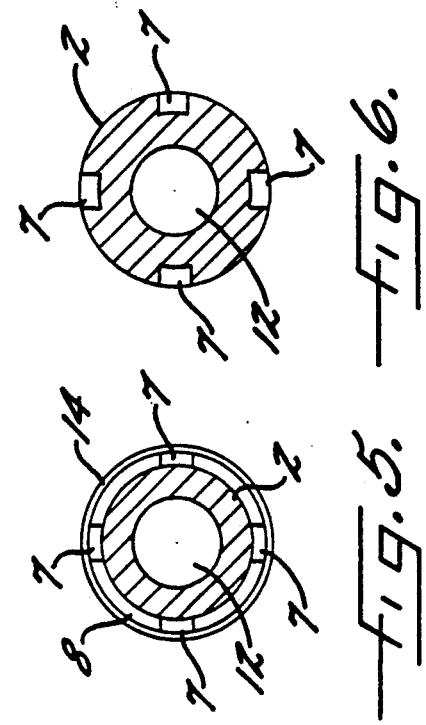
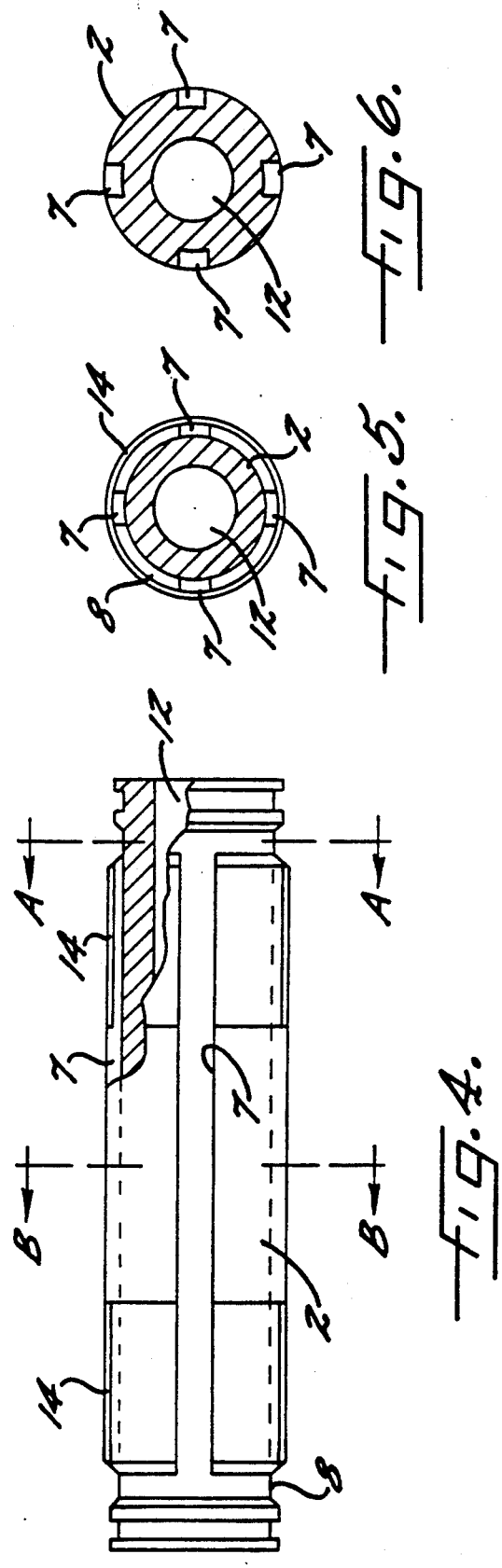

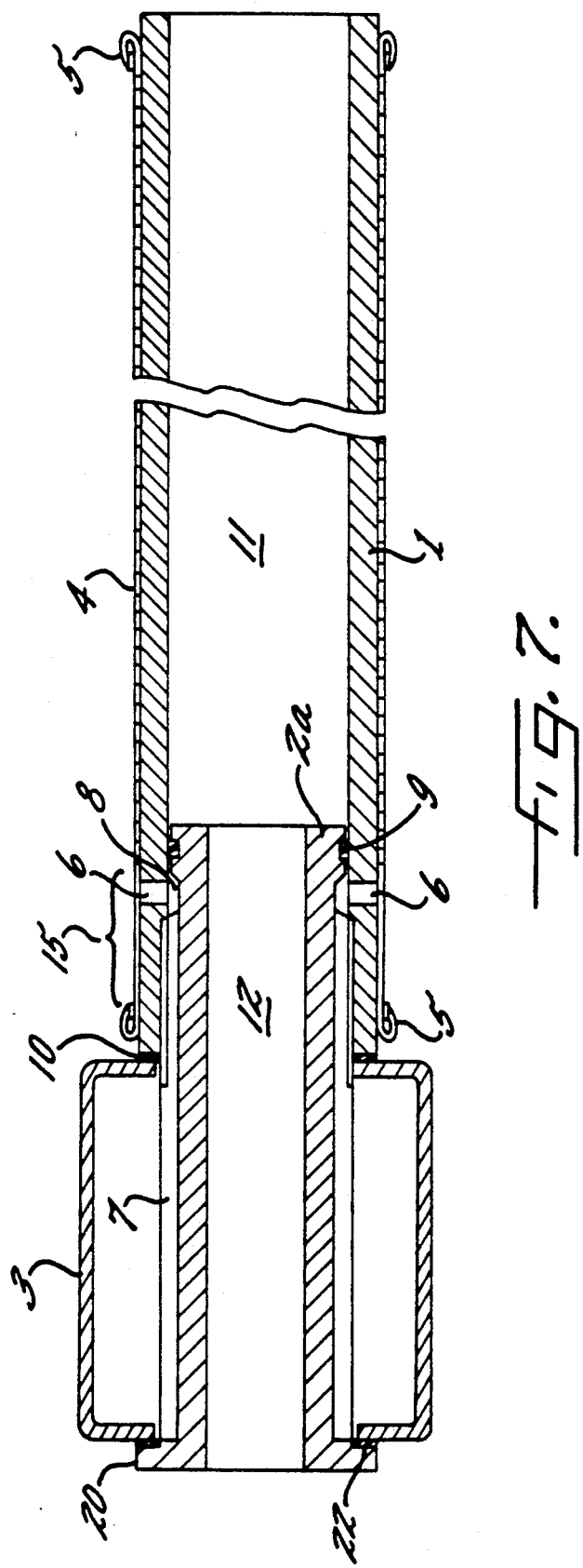

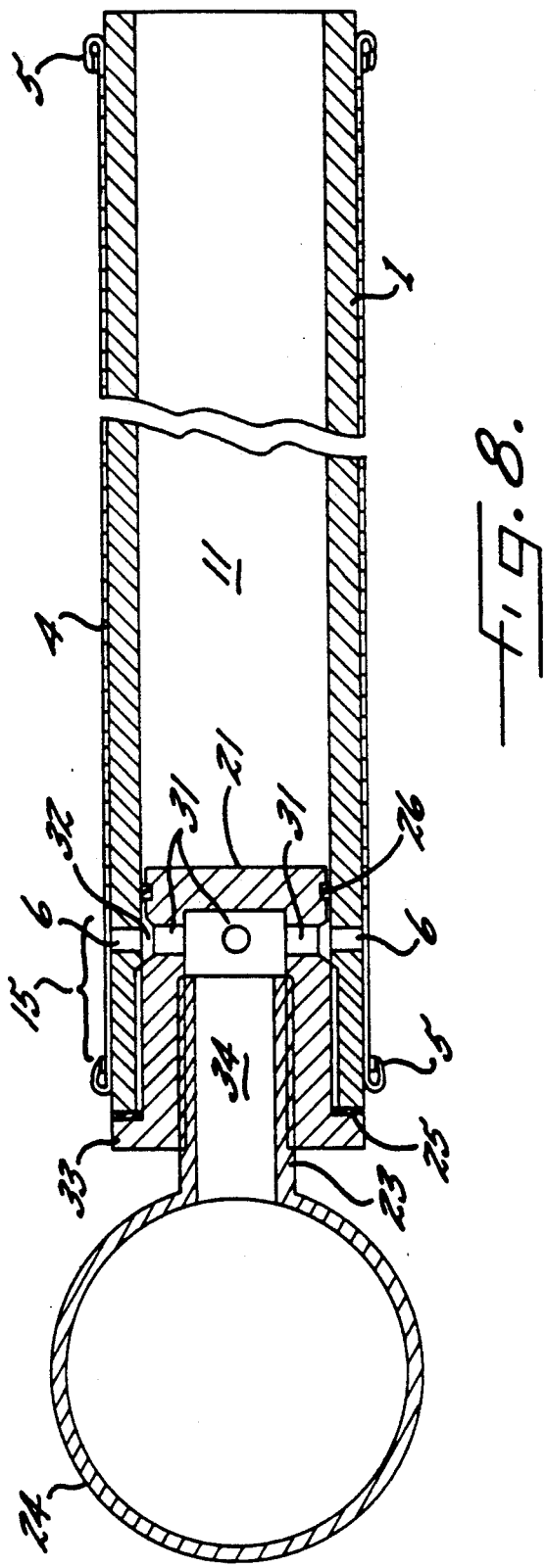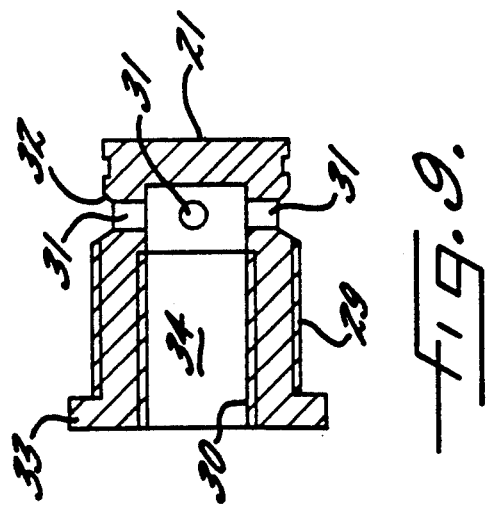

5,304,301

APPARATUS FOR THE INJECTION OF COMPRESSED AIR INTO A LIQUID

FIELD OF THE INVENTION

The invention relates to an apparatus for the injection of compressed air into a liquid, in particular waste water, having a tubular basic body, which is surrounded by a flexible perforated membrane, through the perforation of which membrane the compressed air is distributed into the liquid as fine bubbles when the air is admitted via one or more radial openings in the basic body and which membrane closely envelopes the basic body when the air is not being admitted, so that no liquid penetrates into the basic body, and having a connecting element which supports the basic body and connects it to a compressed air supply pipe.

BACKGROUND OF THE INVENTION

Aeration apparatuses of the abovementioned type are known, for example, from German patent 3,319,161 or German patent 3,819,305, in which antechamber-like gas or compressed air spaces are provided as well as so-called flooding spaces, which are separate from the gas or compressed air spaces and can be flooded by the surrounding liquid. The gas or compressed air spaces are separated from the flooding spaces by various means, for example inserted partition walls or walls which are of one part with the basic bodies. It has been found that the known designs are not mechanically robust enough for use in waste water purifying plants, often exhibiting damage in the partition wall region. They are not suitable for practical continuous operation. Subdividing the basic body into a number of chambers makes the production expenditure for the known aeration apparatuses quite high. Closed-end flooding spaces produced by partition walls form dead zones, in which no liquid exchange takes place.

The invention is based on the object of providing an aeration apparatus of the type mentioned at the beginning, of which the supporting connection between the basic body and the compressed air supply pipe is much more stable than in the case of the known constructions and the overall design is much more simple and consequently less expensive to produce.

SUMMARY OF THE INVENTION

The design according to the invention for achieving this object is distinguished by the fact that the basic body comprises a commercially available pipe section with a fastening element and at least one radial air through-opening, a supporting body with at least one axially directed air supply groove serving as connecting element between the basic body and the compressed air supply pipe, which supporting body extends with one end into the compressed air supply pipe and engages with its free end in the basic body, providing support and sealing the latter from the liquid. Further features, advantageously developing the subject of the invention, are specified in the subclaims.

The design according to the invention of basic body and connecting element and their interaction reduces the basic body in contrast to the known designs to a simple, commercially available pipe without further internals. In contrast to the known, less durable designs, a particular advantage is the high durability of the fastening between the basic body and connecting element which can be achieved by the design according to the invention with the greatest possible thread diameter. The fastening can be adapted by the length of thread and the dimensioning of the thread diameter to all loads occurring in practice. The functions of compressed air supply to the radial compressed air outlet openings of the basic body, sealing between the compressed air region and the liquid region, connecting and supporting two basic bodies arranged in pairs with a common axis and connecting the flooding spaces of two basic bodies arranged in pairs to each other can be performed by a combined connecting element. This is designed as a one-piece component and can be produced inexpensively, for example by injection molding. A further advantage of the invention is the buoyantless behavior of the aeration apparatus due to the absence of gas-filled or air-filled antechambers or compartments.

In the case of the design according to the invention it is advantageous in process engineering terms that the connection of the flooding spaces of two basic bodies arranged in pairs by means of the connecting element allows the liquid to flow through, thus permitting an automatic liquid exchange and thus avoiding undesired microbiological reactions, such as can occur in liquid dead zones of known aeration apparatuses. However, complete throughflow is also possible in the case of a design only having basic bodies arranged on a compressed air supply pipe or supporting element on one side, provided that the hollow connecting element supporting the basic body is fastened by its end remote from the basic body to the compressed air supply pipe in a way which seals against the surrounding liquid.

According to a further advantageous feature, the connecting element is designed as a sleeve closed at one end and is provided both with an external thread for screwing into the basic body and also with an internal thread for screwing onto a pipe nipple of the compressed air supply pipe, the connecting element having a collar which bears in a sealing manner against the end wall of the basic body. This makes it possible to use the described tubular basic body unchanged, and consequently as a standard basic body, also for commercially available compressed air supply and supporting elements which are equipped with customary pipe nipples. For passing on the compressed air from the compressed air supply pipe via a pipe nipple into the space between the membrane and the basic body, the connecting element is provided with radial bores, which connect its inner space to a compressed air supply groove taken around its outer circumference. From there, the compressed air can pass through the radial bores of the tubular basic body to the flexible, perforated membrane.

BRIEF DESCRIPTION OF THE DRAWINGS

Three illustrative embodiments of the invention are explained below and are represented in the drawing, in which FIG. 1 shows a longitudinal section through a completely fitted aeration apparatus with paired arrangement of the basic bodies on a central compressed air supply and supporting element, FIG. 2 shows a detail and longitudinal section of basic body and connecting element in the fitted state, FIG. 3 shows a longitudinal section through the basic body, FIG. 4 shows the connecting element, FIG. 5 shows the cross section A—A through the connecting element in the region of a peripheral compressed air supply groove, FIG. 6 shows the cross section B—B through the connecting element in the region of the axial compressed air supply grooves, FIG. 7 shows a longitudinal section through a single basic body arranged on a compressed air supply and supporting element, with associated connecting element, FIG. 8 shows a section through a basic body fitted to a pipe nipple of a compressed air supply pipe and FIG. 9 shows a longitudinal section through the connecting element according to FIG. 8.

DESCRIPTION OF THE ILLUSTRATED EMBODIMENTS

FIG. 1 shows a completely fitted aeration apparatus with the basic bodies 1 arranged in pairs, the common connecting element 2 and the central compressed air supply and supporting element 3, which in the illustrative embodiment represented is designed as a rectangular tube.

The basic body 1 comprises a simple, for example commercially available, pipe which at one end bears a fastening element which is expediently designed as internal thread 13. For passage of the compressed air from the inside of the pipe under the flexible, perforated membrane 4 shown in FIG. 2, one or more compressed air outlet openings 6 are made in the basic body pipe 1.

The connecting element 2 represented in FIG. 4, FIG. 5 and FIG. 6 is symmetrically designed and bears on each of both sides an external thread 14, onto which in each case a basic body is screwed by the internal thread 13 on both sides of the central compressed air supply and supporting element 3.

The perforated membrane 4 represented in FIG. 2 is fastened by tensioning clamps 5 on the basic body 1 and is unperforated in the region 15 over the compressed air through-openings 6.

The compressed air conduction from the central compressed air supply and supporting element 3 to the compressed air through-openings 6 of the basic body 1 takes place via axial compressed air supply grooves 7 into a peripheral compressed air supply groove 8 and from there into the compressed air through-openings 6 under the unperforated region 15 of the flexible, perforated membrane 4.

The compressed air flowing in forms underneath the flexible, perforated membrane 4 a bulking space, from which it passes through the perforation of the membrane 4 into the liquid.

The sealing ring 9 seals off the peripheral compressed air supply groove 8 from the flooding space 11. The sealing ring 10 seals off the axial compressed air supply grooves 7 from the surrounding liquid.

The hollow space 12 of the connecting element 2 connects the flooding spaces 11 of the basic bodies 1 arranged in pairs, so that a liquid exchange can take place automatically in the flooding spaces 11.

In the case of the embodiment according to FIG. 7, the basic body 1 is fastened only on one side to the compressed air supply and supporting element 3. The connecting element 2a passes through the supporting element 3 and bears against its side remote from the basic body 1 by means of a flange or collar 20. A sealing ring 22 provides the necessary sealing from the surrounding liquid. In the case of this illustrative embodiment as well, the liquid can flow unhindered through the flooding space 11 and the hollow space 12 of the connecting element 2a.

The completely fitted aeration apparatus according to FIG. 8 shows the connection between the tubular basic body 1 and the supporting compressed air supply pipe 24 via a connecting element 21 of sleeve-shaped design. The connecting piece 21 comprises a hollow body, for example able to be produced inexpensively by injection molding, with an external thread 29 and an internal thread 30. In the fitted state, the external thread 29 mates with the corresponding internal thread 13 of the tubular basic body 1. The connecting element can be screwed by the internal thread 30 onto a pipe nipple 23 of the compressed air supply pipe 24.

The inner space 34 of the connecting element 21 is connected via radial bores 31 to an external peripheral compressed air supply groove 32. The connecting element is provided with a collar 33, which bears against the end face of the tubular basic body 1, enclosing a sealing ring 25. At the opposite end, a sealing ring 26 provides the hermetic sealing off of the inner space 11, flooded with waste water, from the compressed air.

The compressed air conducted out of the compressed air supply pipe 24 flows through the pipe nipple 23 into the inner space of the connecting element 20 and leaves the latter via the radial bores 31. From there, it passes into an annular groove 32, which is hermetically sealed off from the waste water by the sealing ring 26, to flow from there via the bores 6 into the intermediate space formed by the perforated membrane 4 and the surface of the tubular basic body 1. From there, the air can pass in fine distribution through the perforation into the surrounding waste water.

What is claimed is:

1. Apparatus for injecting compressed air into a liquid, said apparatus comprising:
    (a) means for supplying compressed air for injecting into the liquid;
    (b) a hollow tubular basic body, said basic body having:
        (i) an exterior surface along at least a portion of which compressed air is distributed into the liquid;
        (ii) an interior surface;
        (iii) a first open end through which compressed air is received from said compressed air supply means;
        (iv) one or more radial openings in said basic body spaced from said first open end for the passage of compressed air from said interior surface to said exterior surface; and
        (v) a second open end opposite said first open end through which is received the liquid into which said apparatus is placed;
    (c) a flexible membrane having perforations through which compressed air is distributed into the liquid as fine bubbles, said membrane surrounding at least a portion of said exterior surface of said basic body including said one or more radial openings adjacent said first open end through which said membrane receives compressed air, said flexible membrane closely enveloping said basic body in the absence of compressed air, thereby substantially preventing liquid from penetrating into said perforations;
    (d) means for supporting said basic body and for connecting said basic body to said compressed air supply means, said supporting and connecting means being of a substantially cylindrical configuration and in axial alignment with said basic body, said supporting and connecting means having:
  (i) a first portion engaging said basic body at said first open end of said basic body, said first portion extending inwardly of said basic body toward said second open end thereof and beyond said one or more radial openings of said basic body and sealingly engaging said interior surface of said basic body at a location adjacent to and beyond said one or more radial openings, thereby defining a flooding zone between said sealingly engaged interior surface and said second open end of said basic body;
  (ii) a second portion engaging said compressed air supply means; and
  (iii) a means for the passage of compressed air from said compressed air supply means through said first open end of said basic body to said radial openings in said basic body, said compressed air passage means including at least one substantially longitudinal passageway extending from said second portion of said supporting and connecting means into to said first portion, said compressed air passage means also including at least one substantially annular passageway connected to said longitudinal passageway and communicating with said radial openings in said basic body; and
e) means for sealing said compressed air passage means from the liquid into which said apparatus is placed, said sealing means and said sealingly engaged inner surface of said basic body defining therebetween a compressed air zone that is separated from said flooding zone and the surrounding liquid into which said apparatus is placed.

2. Apparatus of claim 1 wherein said first open end of said basic body and said first portion of said supporting and connecting means are further engaged through respective radially internal and radially external mating threaded portions.

3. Apparatus of claim 2 wherein said radially internal mating threaded portion of said basic body extends from said first open end of said basic body to a position adjacent said radial openings in said basic body.

4. Apparatus of claim 1 wherein said first open end of said basic body and said first portion of said supporting and connecting means are engaged through respective radially internal and radially external mating threaded portions, and wherein said supporting and connecting means includes a peripheral groove on said first portion thereof at said sealingly engaging location with a sealing ring seated in said groove for sealingly engaging said interior surface of said basic body and defining said flooding zone between said sealingly engaged interior surface and said second open end of said basic body.

5. Apparatus of claim 4 wherein said sealing ring is in movable and sealing engagement with said interior surface of said basic body over a portion of its length, thereby sealing engaging said interior surface of said basic body independently of the extent of engagement of said supporting and connecting means and said basic body by said mating threaded portions.

6. Apparatus of claim 1 wherein said flexible membrane surrounding said basic body includes an unperforated zone over said one or more radial openings in said basic body.

7. Apparatus of claim 6 wherein said unperforated zone of said flexible membrane and said perforated zone are located adjacent each other.

8. Apparatus of claim 1 including at least one pair of said basic bodies and one of said supporting and connecting means for each said pair, wherein each of said supporting and connecting means is a hollow, tubular member open at each end thereof and having an inner surface and an outer surface, said supporting and connecting means first portion including each said open end of said tubular member and said supporting and connecting means second portion including a portion of said tubular member intermediate said ends, each said first portion engaging one of said pair of basic bodies to define a common supporting and connecting means having opposed said first portions extending from said compressed air supply means and said second portion located inside said compressed air supply means, whereby said liquid flooding zone is common to each of said pair of basic bodies and extends through said common supporting and connecting means on said inner surface thereof so that liquid can flow through said common flooding zone.

9. Apparatus of claim 8 wherein said longitudinal passageways of said compressed air passage means are arranged concentrically and longitudinally on said outer surface of each said supporting and connecting means.

10. Apparatus of claim 9 wherein said annular passageways of said compressed air passage means include a pair of annular passageways for compressed air on said outer surface of each said first portion of said supporting and connecting means, each one of said pair of annular passageways being located in register with said radial openings in one of said pair of basic bodies, each said annular passageway being in communication with said longitudinal passageway on said outer surface of said supporting and connecting means and with said radial openings in one of said pair of basic bodies for connecting said compressed air supply means with said one or more radial openings in each of said basic bodies.

11. Apparatus of claim 10 wherein said first open end of said basic body defines a terminal annular end abutment that abuts said compressed air supply means, and wherein said means for sealing said compressed air passage means from the liquid into which said apparatus is placed comprises a sealing ring located between each said terminal annular end abutment and said compressed air supply means, thereby defining with said sealingly engaged interior surface of said basic body a compressed air zone on said outer surface of said supporting and connecting means and extending from said second portion thereof inside said compressed air supply means to said annular passageway communicating with said radial openings in each said basic body.

12. Apparatus of claim 11 wherein the volume of said common flooding zone is greater than 1.3 times the volume of said compressed air zone.

13. Apparatus of claim 1 wherein said supporting and connecting means is a hollow, tubular member open at each end thereof and wherein said supporting and connecting means first portion includes one end and said second portion includes the opposite end to define a said first portion extending exterior to said compressed air supply means and an opposed said second portion located inside said compressed air supply means and passing through said compressed air supply means to the exterior thereof opposite said first portion, whereby said liquid flooding zone extends through said basic body and said member so that liquid can flow through said flooding zone.

14. Apparatus of claim 13 wherein said longitudinal passageways for the passage of compressed air are arranged concentrically and longitudinally on said hollow, tubular member about said flooding zone.

15. Apparatus of claim 14 wherein said first open end of said basic body defines a terminal annular end abutment that abuts said compressed air supply means about said first portion of said supporting and connecting means member, wherein said second portion of said supporting and connecting means includes a flange extending outward therefrom exterior to said compressed air supply means and engaging said compressed air supply means opposite said first portion of said supporting and connecting means, and wherein said means for sealing said compressed air passage means from the liquid into which said apparatus is placed comprises a first sealing ring located between said terminal annular end abutment and said compressed air supply means and a second sealing ring located between said flange and said compressed air supply means, thereby defining a compressed air zone on the surface of said supporting and connecting member and extending from said second portion thereof inside said compressed air supply means to said annular passageway communicating with said radial openings in said basic body.

16. Apparatus of claim 1 wherein said compressed air supply means includes a projecting nipple for inwardly engaging said supporting and connecting means, and wherein said supporting and connecting means is a hollow, sleeve-shaped member closed at one end, open at the other end, and having a radially outer surface and a radially inner surface, said radially inner surface extending from said open end to said closed end, said supporting and connecting means first portion including said outer surface of said member for engaging said basic body inwardly thereof with said closed end facing said second open end of said basic body, said supporting and connecting means second portion including said open end thereof and said radially inner surface for engaging said nipple outwardly thereof, and wherein said compressed air passage means includes a central longitudinal passageway extending from said open end to said closed end, said annular passageway on the radially outer surface, and one or more radial openings adjacent said closed end and extending from said central longitudinal passageway to said annular passageway on said outer surface of said member for supplying compressed air from said compressed air supply means to said radial openings in said basic body.

17. Apparatus of claim 16 wherein said first open end of said basic body and said sleeve-shaped member are engaged through respective radially internal and radially external mating threaded portions, and wherein said sleeve-shaped member includes a peripheral groove on the outer surface thereof between said closed end and said radial openings with a sealing ring seated in said groove for sealingly engaging said interior surface of said basic body and defining a flooding zone between said closed end of said sleeve-shaped member and said second open end of said basic body.

18. Apparatus of claim 16 wherein said sleeve-shaped member includes a flange extending radially outwardly therefrom adjacent said open end of said member, and said first open end of said basic body defines a terminal annular end abutment for abutting said flange, and wherein said means for sealing said compressed air passage means from the liquid into which said apparatus is placed comprises a sealing ring located between said terminal annular end abutment and said flange.

19. Apparatus for injecting compressed air into a liquid, said apparatus comprising:
  (a) means for supplying compressed air for injecting into the liquid;
  (b) at least one pair of hollow tubular basic bodies, each basic body of said pair having:
    (i) an exterior surface along at least a portion of which compressed air is distributed into the liquid;
    (ii) an inner surface;
    (iii) a first open end through which compressed air is received from said compressed air supply means;
    (iv) one or more radial openings spaced from said first open end for the passage of compressed air to said exterior surface; and
    (v) a second open end opposite said first open end through which is received the liquid into which said apparatus is placed;
  (c) a flexible membrane for each said basic body, said flexible membrane having perforations through which compressed air is distributed into the liquid as fine bubbles, said membrane surrounding at least a portion of said exterior surface of said basic body including said one or more radial openings adjacent said first open end through which said membrane receives compressed air, said flexible membrane closely enveloping said basic body in the absence of compressed air, thereby substantially preventing liquid from penetrating into said perforations;
  (d) a hollow, tubular member open at each end thereof for supporting said pair of basic bodies, for connecting said pair of basic bodies to said compressed air supply means, and for providing a common flooding zone for the flow of liquid through the pair of basic bodies, said member being in axial alignment with said basic bodies and having:
    (i) opposed end portions for sealingly engaging the inner surface of each of said pair of basic bodies at a location adjacent to and beyond said one or more radial openings in each of said basic bodies, thereby defining a flooding zone between the sealingly engaged inner surface and said second end of each of said pair of basic bodies;
    (ii) a portion intermediate said ends for inwardly engaging said compressed air supply means centrally of said pair of basic bodies; and
    (iii) one or more compressed air passageways arranged concentrically and longitudinally about the exterior of said member and extending from said intermediate portion inward of said compressed air supply means to said opposed end portions for the passage of air from said compressed air supply means inward of said basic bodies to said radial openings in said basic bodies; and
  (e) means for sealing said compressed air passageways from the liquid to define a compressed air zone on the exterior of said hollow, tubular member and a flooding zone on the interior of said hollow, tubular member that is common to said pair of basic bodies and provides for the flow of liquid therethrough.

20. The apparatus of claim 19 wherein said hollow, tubular member further comprises an annular compressed air passageway about the outer surface of each said end portion of said member and communicating with said longitudinal passageways and said radial openings in said basic body for supplying air from said compressed air supply means to said radial openings in said basic body.

21. Apparatus for injecting compressed air into a liquid, said apparatus comprising:
  (a) means for supplying compressed air for injecting into the liquid;
  (b) at least one of tubular basic body having:
    (i) an exterior surface along at least a portion of which compressed air is distributed into the liquid;
    (ii) an inner surface;
    (iii) a first open end through which compressed air is received from said compressed air supply means;
    (iv) one or more radial openings spaced from said first open end for the passage of compressed air to said exterior surface; and
    (v) a second open end through which is received the liquid into which said apparatus is placed;
  (c) a flexible membrane for said basic body, said flexible membrane having perforations through which compressed air is distributed into the liquid as fine bubbles, said membrane surrounding at least a portion of said exterior surface of said basic body including said one or more radial openings adjacent said first open end through which said membrane receives compressed air, said flexible membrane closely enveloping said basic body in the absence of compressed air, thereby substantially preventing liquid from penetrating into said perforations;
  (d) a hollow, tubular member open at each end thereof for connecting said basic body to said compressed air supply means and for providing a flooding zone for the flow of liquid through said basic body, said member having:
    (i) a first end portion for inwardly engaging said basic body;
    (ii) a second opposed end portion for inwardly engaging said compressed air supply means and passing through said compressed air supply means to the exterior thereof opposite said first portion, said second opposed end portion including a flange extending radially outward therefrom exterior to said compressed air supply means and abutting said compressed air supply means opposite said first portion, whereby said liquid flooding zone extends through said basic body and said member so that liquid can flow through said flooding zone;
    (iii) one or more compressed air passageways arranged concentrically and longitudinally about the exterior of said member and extending from said second portion inward of said compressed air supply means to said opposed first end portion for the passage of air from said compressed air supply means inward of said basic body to said radial openings in said basic body for supplying air from said compressed air supply means to said radial openings in said basic body; and
  (e) means for sealing said compressed air passageways from the liquid to define a compressed air zone on the exterior of said hollow, tubular member and a flooding zone on the interior of said hollow, tubular member and said basic body through which liquid can flow.

22. The apparatus of claim 21 wherein said hollow, tubular member further comprises an annular compressed air passageway about the outer surface of said first end portion of said member and communicating with said longitudinal passageways and said radial openings in said basic body for supplying air from said longitudinal passageways to said radial openings.

23. The apparatus of claim 22 wherein said first open end of said basic body defines a terminal annular end abutment that abuts said compressed air supply means, and wherein said means for sealing said compressed air passageways from the liquid to define said compressed air zone and said flooding zone comprises:
  (i) a first sealing ring located between said terminal annular end abutment of said basic body and said compressed air supply means;
  (ii) a second sealing ring located between said flange and said compressed air supply means, said first and second sealing rings sealing said passageways for compressed air from the surrounding liquid into which said apparatus is placed;
  (iii) a peripheral groove on said first end portion of said member opposite said annular compressed air passageway from said second portion of said member; and
  (iv) a third sealing ring seated in said peripheral groove, said third sealing ring sealingly engaging said interior surface of said basic body inwardly of said radial openings in said basic body, thereby defining flooding zones between said sealingly engaged inner surface of said basic body and said second open end of said basic body, said first, second, and third sealing rings defining said compressed air zone that is separated from said flooding zone and the surrounding liquid into which said apparatus is placed.

24. Apparatus for injecting compressed air into a liquid, said apparatus comprising:
  (a) means for supplying compressed air for injecting into the liquid, said means including a projecting nipple;
  (b) a tubular basic body, said basic body having:
    (i) an exterior surface along at least a portion of which compressed air is distributed into the liquid;
    (ii) an inner surface;
    (iii) a terminal annular end abutment defining a first open end through which compressed air is received from said nipple on said compressed air supply means;
    (iv) one or more radial openings spaced from said terminal annular end abutment for the passage of compressed air to said exterior surface; and
    (v) a second open end through which is received the liquid into which said apparatus is placed;
  (c) a flexible membrane having perforations through which compressed air is distributed into the liquid as fine bubbles, said membrane surrounding at least a portion of said exterior surface of said basic body including said one or more radial openings adjacent said first open end through which said membrane receives compressed air, said flexible membrane closely enveloping said basic body in the absence of compressed air, thereby substantially preventing liquid from penetrating into said perforations;

(d) a substantially cylindrical and sleeve-shaped member closed at one end and open at the opposite end for supporting said basic body and for connecting said basic body to said compressed air supply means, said supporting and connecting member having:
  (i) a radially outer surface, said radially outer surface engaging said basic body at said first open end of said basic body and extending inwardly of said basic body with said closed end facing said second open end of said basic body, said radially outer surface extending beyond said one or more radial openings of said basic body;
  (ii) a peripheral groove adjacent said closed end on said outer surface beyond said radial openings and having a first sealing ring seated therein for sealingly engaging said interior surface of said basic body, thereby defining a flooding zone between said closed end of said member and said second open end of said basic body;
  (iii) a central passageway for compressed air extending from said open end of said member to said closed end and outwardly engaging said projecting nipple on said compressed air supply means;
  (iv) at least one radial passageway extending from said central passageway to said outer surface of said member;
  (v) an annular passageway on said outer surface of said member and aligned with said radial passageways for receiving compressed air therefrom and for supplying compressed air to said one or more radial openings in said basic body;
  (vi) a flange extending radially outwardly from said outer surface at said open end of said member for abutting said terminal annular end abutment of said basic body; and
(e) a second sealing ring seated between said terminal annular end abutment of said basic body and said flange for sealing said central passageway from the liquid into which said apparatus is placed, said first and second sealing rings defining therebetween a compressed air zone that is separated from said flooding zone and the surrounding liquid into which said apparatus is placed.

25. Apparatus for injecting compressed air into a liquid, said apparatus comprising:
(a) means for supplying compressed air for injecting into the liquid;
(b) at least one pair of tubular basic bodies, each basic body of said pair having:
  (i) an exterior surface along at least a portion of which compressed air is distributed into the liquid;
  (ii) an inner surface;
  (iii) a first open end through which compressed air is received from said compressed air supply means, said first open end defining a terminal annular end abutment that abuts said compressed air supply means;
  (iv) one or more radial openings spaced from said first open end for the passage of compressed air to said exterior surface; and
  (v) a second open end through which is received the liquid into which said apparatus is placed;
(c) a flexible membrane for each said basic body, said flexible membrane having perforations through which compressed air is distributed into the liquid as fine bubbles, said membrane surrounding at least a portion of said exterior surface of said basic body including said one or more radial openings adjacent said first open end through which said membrane receives compressed air, said flexible membrane closely enveloping said basic body in the absence of compressed air, thereby substantially preventing liquid from penetrating into said perforations;
(d) a hollow, tubular member open at each end thereof for supporting said pair of basic bodies, for connecting said pair of basic bodies to said compressed air supply means, and for providing a common flooding zone for the flow of liquid through the pair of basic bodies, said member having:
  (i) opposed end portions for inwardly engaging one of each of said pair of basic bodies;
  (ii) a portion intermediate said ends for inwardly engaging said compressed air supply means centrally of said pair of basic bodies; and
  (iii) a means for the passage of compressed air from said compressed air supply means inward of said basic bodies to said radial openings in said basic bodies, said compressed air passage means including one or more compressed air passageways arranged concentrically and longitudinally about the exterior of said member and extending from said intermediate portion inward of said compressed air supply means to said opposed end portions, said compressed air passage means also including an annular compressed air passageway about the outer surface of each said end portion of said member and communicating with said longitudinal passageways and said radial openings in said basic body for supplying air from said compressed air supply means to said radial openings in said basic body; and
(e) means for sealing said compressed air passage means from the liquid into which said apparatus is placed to define a compressed air zone on the exterior of said hollow, tubular member and a flooding zone on the interior of said hollow, tubular member that is common to said pair of basic bodies and provides for the flow of liquid therethrough, said sealing means comprising:
  (i) a first pair of sealing rings, one of said sealing rings of said first pair located between each said terminal annular end abutment of said basic bodies and said compressed air supply means for sealing said passageways for compressed air from the surrounding liquid into which said apparatus is placed;
  (ii) a pair of peripheral grooves, one on each said end portion of said member opposite said annular compressed air passageway from said central portion of said member; and
  (iii) a second pair of sealing rings, one of said pair seated in each one of said pair of peripheral grooves, said sealing rings sealingly engaging said interior surfaces of said basic bodies inwardly of said radial openings in said basic bodies, thereby defining said flooding zone between said sealingly engaged inner surfaces of said basic bodies and said second open ends of said basic bodies, said first and second pairs of sealing rings thereby defining said compressed air zone that is separated from said flooding zone and the surrounding liquid into which said apparatus is placed.

* * * * *